United States Patent
Ott et al.

(10) Patent No.: US 10,551,815 B2
(45) Date of Patent: Feb. 4, 2020

(54) SYSTEMS AND METHODS FOR ENHANCED MODULAR CONTROLLER PORT TO PORT COMMUNICATION

(71) Applicant: FISHER-ROSEMOUNT SYSTEMS, INC., Round Rock, TX (US)

(72) Inventors: Michael G. Ott, Round Rock, TX (US); Brandon Hieb, Cedar Park, TX (US); William E. Bennett, Georgetown, TX (US); Anthony Amaro, Jr., Round Rock, TX (US); Brian M. Capoccia, Round Rock, TX (US); Robert Gustaf Halgren, III, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 126 days.

(21) Appl. No.: 15/720,654

(22) Filed: Sep. 29, 2017

(65) Prior Publication Data
US 2019/0079486 A1  Mar. 14, 2019

Related U.S. Application Data

(60) Provisional application No. 62/558,308, filed on Sep. 13, 2017.

(51) Int. Cl.
*G06F 3/0484* (2013.01)
*G05B 19/05* (2006.01)
(Continued)

(52) U.S. Cl.
CPC ........ *G05B 19/056* (2013.01); *G05B 19/4185* (2013.01); *H04W 84/10* (2013.01); *G05B 19/41845* (2013.01)

(58) Field of Classification Search
None
See application file for complete search history.

(56) References Cited

U.S. PATENT DOCUMENTS 7,822,896 B1   10/2010 Sagues et al.
2007/0223382 A1   9/2007 Crabtree et al.
(Continued)

FOREIGN PATENT DOCUMENTS

WO   WO-2015/174971 A1   11/2015

OTHER PUBLICATIONS

Micrel Inc., "KSZ8895MQ/RQ/FMQ, Integrated 5-Port 10/100 Managed Ethernet Switch with MII/RMII Interface" (Rev. 1.6) dated Jan. 22, 2013.
(Continued)

*Primary Examiner* — Hyun Nam
(74) *Attorney, Agent, or Firm* — Marshall, Gerstein & Borun LLP

(57) ABSTRACT

An enhanced modular controller is disclosed that includes a plurality of configurable communication ports and a control logic layer operable to control equipment of a process plant. The plurality of communication ports include a first set of communication ports and a second set of communication ports which are operable to communicate with one or more nodes of a distributed control system of the process plant. The enhanced modular controller also includes a software layer that accepts port configuration parameters that define one or more port communication rules for the first set of communication ports and for the second set of communication ports. The one or more port communication rules causes the software layer to selectively allow or restrict retransmission of incoming messages, where the incoming messages are received at the first set of communication ports or the second set of communication ports.

34 Claims, 4 Drawing Sheets

(51) Int. Cl.
*H04W 84/10* (2009.01)
*G05B 19/418* (2006.01)

(56) References Cited

U.S. PATENT DOCUMENTS

| | | | |
|---|---|---|---|
| 2010/0204806 A1* | 8/2010 | Chowaniec | G05B 19/054 |
| | | | 700/19 |
| 2015/0039786 A1* | 2/2015 | Martin | G06F 13/122 |
| | | | 710/8 |
| 2015/0261717 A1* | 9/2015 | Greiner-Jacob | G05B 19/4185 |
| | | | 710/109 |

OTHER PUBLICATIONS

Search Report for Application No. GB1813745.5, dated Feb. 21, 2019.

* cited by examiner

SYSTEMS AND METHODS FOR ENHANCED MODULAR CONTROLLER PORT TO PORT COMMUNICATION

RELATED APPLICATION

This application claims the benefit of priority under 35 U.S.C. § 119 of U.S. Provisional Application No. 62/558,308 (filed on Sep. 13, 2017). The entirety of the foregoing provisional application is incorporated by reference herein.

FIELD OF THE TECHNOLOGY

This disclosure relates generally to using modular control systems such as skid-mounted systems with process plants and, in particular, to configuring a plurality of communication ports of a modular controller of a modular control system for communication within a distributed control system of a process plant.

BACKGROUND INFORMATION

Modular control systems, used today in a variety of industries, are complete control systems that can provide specific functionality, such as boiling water, filtering liquids, or controlling heat exchange. A modular control system typically is implemented as a skid-mounted system, or simply "skid," so called because the system is enclosed within a frame and is easily transported. A skid can be delivered to a factory as an integral unit, without being disassembled and reassembled, and typically preconfigured by the manufacturer. A skid generally includes a programmable logic controller (PLC), specialized equipment such as valves or boilers, and sensors such as pressure or temperature sensors, for example.

On the other hand, distributed control systems (DCS) also are used in a variety of process industries including chemical, petrochemical, refining, pharmaceutical, food and beverage, power, cement, water and wastewater, oil and gas, pulp and paper, and steel, and are used to control batch, fed-batch, and continuous processes operating at a single site or at remote locations. Process plants typically include one or more process controllers communicatively coupled to one or more field devices via analog, digital or combined analog/digital buses, or via a wireless communication link or network. Collectively, the various devices perform monitoring, control, and data collection functions to control the process, safety shutdown systems, fire and gas detection systems, machine health monitoring systems, maintenance systems, decision support, and other systems.

The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc. to control one or more processes executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration engineer to create or to change operator interfaces, which are used by a viewing application to display data to an operator, and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Devices operating in process control and industrial automation systems can be interconnected in a wired or wireless manner, and communicate using industrial communication protocols such as FOUNDATION™ Fieldbus, HART®, or Profibus. Further, protocols such as Modbus have been developed to interconnect PLCs. Still further, in addition to standard industrial automation protocols there exist proprietary protocols for interconnecting nodes in a process control system. DeltaV is an example of one such protocol. In general, these protocols specify formats for conveying measurements, alerts and status reports, commands that affect process variables or automation parameters, commands for activating or deactivating devices, etc. A typical industrial communication protocol also supports device configuration, via pre-defined commands or commands defined by manufacturers for specific devices in accordance with the syntax of the protocol.

While using skids equipped with PLCs is a popular approach to building a process control plant, PLCs today cannot be integrated natively into a large DCS. PLCs generally rely on proprietary protocols, configuration, and security. At best, operators can use weak integration via Modbus or some other standard protocol to bring PLCs into a larger system. Weak integration is a manual process that does not withstand certain types of changes and requires manual maintenance as the system evolves.

In addition, PLCs may experience configuration limitations because PLCs typically have limited, or difficult to manage, port configuration options. For example, a PLC's configuration limitations can be attributable to a PLC's communication ports limitations or inability to communicate with other nodes of a process plant via a network or data highway of the process plant. For example, a typical PLC may include dedicated communication ports that allow only certain types of protocols, such that other nodes in the process plant, communicating using different protocols, would not be able to connect to the PLC via the dedicated ports. The dedicated ports are especially problematic where the PLC has few or a limited number of communication ports. For example, a PLC providing a single dedicated port for each of a variety of communication protocols (e.g., one port for Modbus, another port for Ethernet, etc.) may inhibit the PLC from retransmitting communications from one port to another port, e.g., because of the different and incompatible communication protocols.

Limited communication ports may also cause problems when a PLC needs to communicate, e.g., receive instructions from and/or provide data to, multiple nodes using the same type of communication protocol, but where the PLC does not have enough communication ports to accommodate all of the nodes of that particular type of communication protocol. In such situations, the PLC would need to utilize multiple external switches to accommodate the additional nodes of the particular communication protocol, which would increase the complexity and costs associated with the distributed process control system of the process plant.

Moreover, in instances where isolation is desired for security reasons, for example, to prohibit certain nodes of the distributed control system from communicating with other nodes via the PLC, then the limited configuration options of the PLC's communication ports creates additional problems. For example, in such instances, the PLC may have limited or no means to control the retransmission of communications (e.g., data packets or messages) to other ports of the PLC. This can lead to security issues where an operator of a skid may desire to prevent certain ports of the PLC from communicating with other ports associated with the PLC in order to control secure access among the nodes connected PLC. In such instances, the skid operator may be forced to add external firewalls to the PLC in order to implement secure access among the nodes connected to the PLC, which would create increased complexity and costs associated with the distributed process control system of the process plant. In addition, such configurations would require additional programmatic and settings configurations to the PLC by the operator, which can be complex, and which can be burdensome because the skid operator would typically have to manually implement such programmatic and settings configuration changes each time the configuration of the PLC changes, for example, each time the nodes and/or communication protocols that are connected to and/or used with the PLC changes.

SUMMARY

In order to overcome the problems associated with the limited configuration capabilities of typical skid-based PLC controllers, various embodiments of an enhanced modular controller are disclosed. The enhanced modular controller may perform the same functionality of a typical PLC controller, but will also include enhanced configurability and functionality as described herein. For example, the enhanced modular controller of the present controllers provides enhanced configurability options, that allows for configuration of a plurality of communication ports of the enhanced modular controller of a modular control system (e.g., skid-based system) for communication within a distributed control system of a process plant. As described herein, benefits of the enhanced modular controller include additional flexibility and configuration options for operators and users of the enhanced modular controller, and therefore modular control system, to achieve communication objectives (e.g., retransmission or restriction of unicast or broadcast-based messages) with minimal need for external switches and firewalls, and without the increased technical complexity and associated financial costs associated with them.

In addition, the enhanced configuration options allow for the design and development of enhanced modular controllers that have fewer physical communication ports, because, instead of utilizing standard dedicated communication ports, the communication ports of the enhanced modular controllers are highly configurable such that they allow for multiple, and different types of configuration options and communication protocols as described herein. In addition, fewer communication ports also allow the enhanced modular controller to operate at a lower internal heat temperature, such that the enhanced modular controller operates more efficiently and with greater stability than a design with more communication ports. For example, a modular controller may be limited to the number of communication ports based on heat factors, but the enhanced modular controller may overcome this issue by providing increased flexibility with configuration options for configuring a fewer number of ports to operate in the same capacity as a modular controller with a larger number of communication ports. Moreover, the enhanced modular controller includes a software layer to optimize the configuration of the communication ports, which, for example, in some embodiments described herein, allows an operator of the enhanced modular controller to configure the enhanced modular controller without the need to understand how to configure smart switches which, in some embodiments, may be used by the enhanced modular controller to facilitate the configuration of the enhanced modular controller's plurality of communication ports as described herein.

An enhanced modular controller of this disclosure may operate in a modular control system, such as a skid-mounted system, to execute the control logic of the modular control system independently of other controllers, similar to a PLC. When integrated into a distributed process control system, the modular controller may operate as one or multiple nodes of a distributed process control system of a process plant. Configuration parameters of the modular controller may be imported or downloaded from a configuration database of the modular control system into the configuration database of the distributed process control system, which may be a central repository of configuration data. In some implementations, the modular controller is built natively on the platform of the distributed process control system. The modular controller in this case can communicate with other nodes of the distributed process control system according to the communication protocol of the distributed process control system, which is proprietary in some implementations. In other implementations, the modular controller is integrated into a third-party distributed process control system, and communicates with the other nodes using a standard industrial communication protocol such as Modbus.

In various embodiments, an enhanced modular controller is disclosed, where the enhanced modular controller includes a plurality of configurable communication ports, and where the enhanced modular controller may be included as part of a modular control system. The enhanced modular controller may include a control logic layer operable to control equipment of a process plant. The equipment is configured to perform a physical function within the process plant as described herein. The enhanced modular controller may also include a plurality of communication ports. The plurality of communication ports may be operable to communicate with one or more nodes of a distributed control system of the process plant. The plurality of communication ports may also include a first set of communication ports and a second set of communication ports.

The enhanced modular controller may also include a software layer that accepts port configuration parameters. The port configuration parameters may define one or more port communication rules for the first set of communication ports and for the second set of communication ports. The one or more port communication rules may also cause the software layer to selectively allow or restrict retransmission of incoming messages, where the incoming messages are received at either the first set of communication ports or the second set of communication ports.

In various embodies, a method for configuring a plurality of communication ports of an enhanced modular controller of a modular control system is disclosed. The method may be implemented by one or more processors of a modular control system or modular controller. For example, a non-transitory computer-readable medium storing instructions that implement configuration of the plurality of communication ports of the enhanced modular controller of a modular control system, may be executed, which may cause the one or more processors to receive, at a software layer, port configuration parameters. The port configuration parameters may define one or more port communication rules for the plurality of communication ports.

In various embodiments, the plurality of communication ports may be operable to communicate with one or more nodes of a distributed control system of a process plant, and the plurality of communication ports may include a first set of communication ports and a second set of communication ports.

The method may further include configuring, based on the one or more port communication rules, the software layer to selectively allow or restrict retransmission of incoming messages. The incoming messages may be received at either the first set of communication ports or the second set of communication ports.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

The Figures depict preferred embodiments for purposes of illustration only. Alternative embodiments of the systems and methods illustrated herein may be employed without departing from the principles of the invention described herein.

DETAILED DESCRIPTION

Generally speaking, a modular control system of this disclosure includes a controller can operate as a standalone PLC, a controller of a skid-mounted system, or as a module in modular plant construction. The controller, referred to below as "modular controller" or "enhanced modular controller," can be built natively on a platform such as DeltaV, which supports distributed control, so that the configuration, security mechanisms, and the communications of the enhanced modular controller are fully compatible with the DCS into which the enhanced modular controller is integrated. As a result, when the modular controller operates as one or several nodes in the DCS, the modular controller does not require the use of an industrial communication protocol to deliver data to the modular controller or to the sub-nodes of the modular controller, or receive data from the modular controller or its sub-nodes. Moreover, the configuration of the enhanced modular controller is compatible with a like-versioned full DCS system, which simplifies bringing of this configuration into a central repository of a DCS.

In some scenarios, a modular control system of this disclosure can be integrated into a process control system built on a different, possibly proprietary platform. In this case, the modular controller can communicate with the nodes of the process control system using an Open Platform Communication (OPC) communication protocol or other standard protocol such as Modbus, Ethernet, etc. However, a merge assistant can communicate with the modular controller natively, e.g., using a DeltaV protocol if the modular controller is built on the DeltaV platform. To this end, the modular controller can support an address in the scheme of the process plant as well as a different address within a modular controller network.

Figure 1:
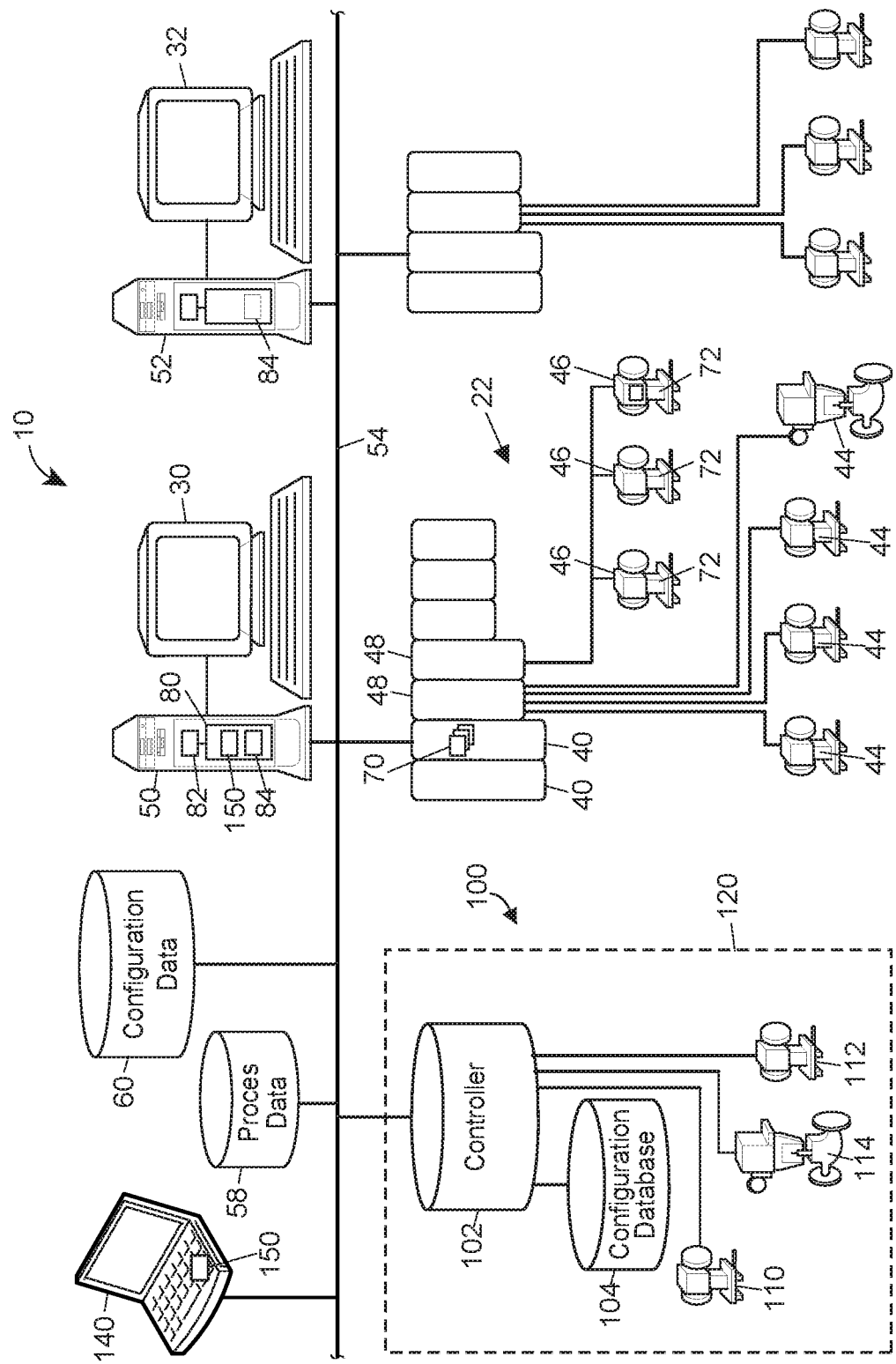
FIG. 1 is a block diagram of a distributed process control system into which an example modular control system is integrated.

FIG. 1 illustrates an example process plant 10 that implements a distributed control system 22. As is typical, the distributed process control system 22 has one or more controllers 40, each connected to one or more field devices or smart devices 44 and 46 via input/output (I/O) devices or cards 48 which may be, for example, Fieldbus interfaces, Profibus interfaces, HART interfaces, standard 4-20 ma interfaces, etc. The controllers 40 are also coupled to one or more host or operator workstations 50 and 52 via a data highway 54 which may be, for example, an Ethernet link or another link suitable local area network (LAN) link. The workstations 50 and 52 may each be connected to output devices 30 and 32, respectively, which are depicted in FIG. 1 as computer screens. A process data database 58 may be connected to the data highway 58 and operates to collect and store parameter, status and other data associated with the controllers and field devices within the plant 10. During operation of the process plant 10, the process data database 58 may receive process data from the controllers 40 and, indirectly, devices 44-46 via the data highway 54.

A configuration database 60 stores the current configuration of the process control system 22 within the plant 10 as downloaded to and stored within the controllers 40 and field devices 44 and 46. The configuration database 60 stores process control functions defining the one or several control strategies of the distributed process control system 22, configuration parameters of the devices 44 and 46, the assignment of the devices 44 and 46 to the process control functions, and other configuration data related to the process plant 10. The configuration database 60 additionally may store graphical objects to provide various graphical representations of elements the process plant 10. Some of the stored graphical objects may correspond to process control functions (e.g., a process graphic developed for a certain PID loop), and other graphical objects may be device-specific (e.g., a graphic corresponding to a pressure sensor).

The process plant 10 also can include other database coupled to the data highway 54, not shown in FIG. 1 to avoid clutter. For example, a data historian can store events, alarms, comments, and courses of action taken by operators. The events, alarms, and comments may pertain to individual devices (e.g., valves, transmitters), communication links (e.g., wired Fieldbus segments, WirelessHART communication links), or process control functions (e.g., a PI control loop for maintaining a desired temperature set point). Further, a knowledge repository can store references, operator logbook entries, help topics, or links to these and other documentation that operators and maintenance technicians may find useful when supervising the process plant 10. Still further, a user database can store information about users such as an operator or maintenance technician associated with the process plant 10. For each user, the user database can store, for example, his or her organizational role, an area within the process plant 10 with which the user is associated, work team association, etc.

Each of these databases can be any desired type of data storage or collection unit having any desired type of memory and any desired or known software, hardware or firmware for storing data. Of course, the databases need not reside in separate physical devices. Thus, in some embodiments, some of these databases are implemented on a shared data processor. In general, it is possible to utilize more or fewer databases to store the data collectively stored and managed by the databases described above.

While the controllers 40, I/O cards 48 and field devices 44 and 46 are typically distributed throughout the sometimes harsh plant environment, the operator workstations 50 and 52 and the databases 58, 60, etc. are usually located in control rooms or other less harsh environments easily assessable by controller, maintenance, and various other plant personnel. However, in some cases, handheld devices may be used to implement these functions and these handheld devices are typically carried to various places in the plant.

As is known, each of the controllers 40, which may be by way of example, the DeltaV™ controller sold by Emerson Process Management, stores and executes a controller application that implements a control strategy using any number of different, independently executed, control modules or blocks 70. Each of the control modules 70 can be made up of what are commonly referred to as function blocks wherein each function block is a part or a subroutine of an overall control routine and operates in conjunction with other function blocks (via communications called links) to implement process control loops within the process plant 10. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc. and are not limited to being designed and implemented using the function block or any other particular programming technique. Each of the controllers 40 may also support the AMS® Suite of applications and may use predictive intelligence to improve availability and performance of production assets including mechanical equipment, electrical systems, process equipment, instruments, field and smart field devices 44, 46, and valves.

In the process plant 10 illustrated in FIG. 1, the field devices 44 and 46 connected to the controllers 40 may be standard 4-20 ma devices, may be smart field devices, such as HART, Profibus, or FOUNDATION™ Fieldbus field devices, which include a processor and a memory, or may be any other desired type of devices. Some of these devices, such as Fieldbus field devices (labeled with reference number 46 in FIG. 1), may store and execute modules, or sub-modules, such as function blocks, associated with the control strategy implemented in the controllers 40. Function blocks 72, which are illustrated in FIG. 1 as being disposed in two different ones of the Fieldbus field devices 46, may be executed in conjunction with the execution of the control modules 70 within the controllers 40 to implement process control, as is well known. Of course, the field devices 44 and 46 may be any types of devices, such as sensors, valves, transmitters, positioners, etc. and the I/O devices 48 may be any types of I/O devices conforming to any desired communication or controller protocol such as HART, Fieldbus, Profibus, etc.

The workstations 50 and 52 can include one or more processors 82 that execute instructions stored in memory 80. The instructions can implement, in part, a viewing application 84 that provides various displays during operation of the process plant 10 to enable an operator to view and control various operations within the process plant 10 or, as is common in larger plants, within a section of the process plant 10 to which the corresponding operator is assigned. The viewing application 84 may include, or cooperate with, support applications such as control diagnostic applications, tuning applications, report generation applications or any other control support applications that may be used to assist an operator in performing control functions. Further, the viewing application 84 can permits a maintenance technician to supervise the maintenance needs of the process plant 10, e.g., to view the operating or working conditions of various devices 40, 44, and 46. The viewing application also may include support applications such as maintenance diagnostic applications, calibration applications, vibration analysis applications, report generation applications or any other maintenance support applications that may be used to assist a maintenance technician in performing maintenance functions within the process plant 10. In various embodiments, the workstations 50 and 52 may allow an operator to choose configuration parameters and/or port communication rules to configure an enhanced module controller 102 as described herein.

With continued reference to FIG. 1, an example modular control system 100 includes an enhanced modular controller 102, a configuration database 104, and specialized equipment that can include field devices 110. The modular control system 100 can be a skid-mounted system in which the devices 102, 104, and 110-114 reside within a physical frame 120. The modular control system 100 can be configured to operate in a standalone mode and perform a relatively complex function in a plant, such as pump liquid in a controlled manner, heat water and maintain a certain temperature in a tank, perform a filtration function, etc. To this end, the modular control system 100 can include valves, tanks, sensors, etc.

In some embodiments, the enhanced modular controller 102 may be built natively on the platform of the distributed control system 22. In other words, the enhanced modular controller 102 may be developed specifically for use in the distributed control system 22, while also being capable of autonomous operation. To this end, the enhanced modular controller 102 may include firmware and/or software functions (e.g., a software layer) that does not require an intermediary (such as a porting/adaptation layer of firmware and/or software or the corresponding application programming interface (API) functions) to interact with the nodes of the distributed control system 22. The enhanced modular controller 102 in certain software architecture may share one or more software layers with other controllers of the distributed control system 22. In any case, as native to the platform of the distributed control system 22, configuration, security mechanisms, and the communications of the enhanced modular controller 102 are fully compatible with the distributed control system 22.

The configuration database 104 may be stored on a non-transitory computer-readable memory such as a hard disk or a flash drive, for example. The computer-readable memory and the enhanced modular controller 102 may be provided as part of a single chipset of separately, depending on the implementation. In some embodiments, configuration parameters and/or port communication rules, as described herein, may be stored in the configuration database 104 and used by the enhanced modular controller 102. In some embodiments, the configuration parameters and/or port communication rules may be downloaded, for example from workstations 50 and 52, or host 140, to the configuration database 104 for immediate or later use by the enhanced modular controller 102.

A manufacturer and/or operator at the process plant 10 can assemble the modular control system 100, configure the parameters of the modular control system 100 with the configuration parameters and/or port communication rules as described herein, and, other values, including setpoint values and other parameter such as the gain value for a PID loop, names and tags for the field devices 110, licenses, locales, etc. The manufacturer and/or operator at the process plant 10 also can configure parameter security. For example, the manufacturer or operator at the process plant 10 can make the gain value a part of restricted control, and require that this value be changed only upon providing a proper key to unlock this variable. In some cases, the manufacturer or operator at the process plant 10 can completely assemble the modular control system 100 as an integral unit.

As illustrated in FIG. 1, the modular control system 100 can be coupled to the process plant 10 and the distributed control system 22 via the data highway 54, also referred to as a network or computer network herein. A host 140, which can be a laptop computer, for example, can execute a merge assistant 150. Alternatively, the merge assistant 150 may be included in the operator workstation 50 or 52. In operation, the merge assistant 150 assists operators with efficiently and accurately merging configuration data from the configuration database 104 into the centralized configuration database 60. In some cases, the merge assistant 150 also generates automatic suggestions regarding renaming or relabeling items in the configuration database 104 to resolve conflicts with items in the configuration database 60. The merge assistant 150 then loads the updated configuration data into the configuration database 104. In some cases, the host 140 stores configuration data of the modular control system 100 while the configuration data is being updated.

According to another implementation, the merge assistant 150 may distribute new configuration data (e.g., the configuration parameters and/or port communication rules describe herein) introduced by way of integrating a modular control system (and therefore an modular controller, e.g., enhanced modular controller 102) into the distributed control system 22, thereby eliminating the need to import new data into the configuration database 60. In particular, rather than copying configuration data, the merge assistant 150 can update the configuration database 104 in situ with new tags to ensure uniqueness in the scope of the distributed control system 22. In this manner, the merge assistant 150 can reduce the time required to integrate a modular control system into a distributed control system, and in some cases may even provide "instant import."

Although FIG. 1 depicts only one modular control system 100, multiple modular control systems can be integrated into the distributed process control system 22. The merge assistant 150 in this case can detect modular control systems coupled to the data highway 54 and iteratively merge the corresponding configurations into the centralized configuration database 60.

The enhanced modular controller 102 may include a plurality of communication ports that can be configured, or otherwise defined, according to numerous native protocols or standard protocols. For example, a first communication port may be configured to use a native proprietary communication protocol such as DeltaV layered over the Internet Protocol (IP), and a second communication port may be configured to use a standard protocol, such as IP, Modbus, or similar known protocols. Such configuration options allow the communication ports to be able communicate with various nodes, of the same or different protocol type, within the distributed control system of the process plant 10. This configuration can be particularly advantageous in instances where the distributed control system 22 and the modular control system 100 are designed by, manufactured by, or otherwise provided by different parties, and where the nodes of the distributed control system 22 do not support the proprietary protocol of the modular control system 100. In such instances, the enhanced modular controller 102 may be added to, or built on, the modular control system 100 to provide native support and/or integration into the process plant 10 that may multiple, different protocols.

Figure 2:
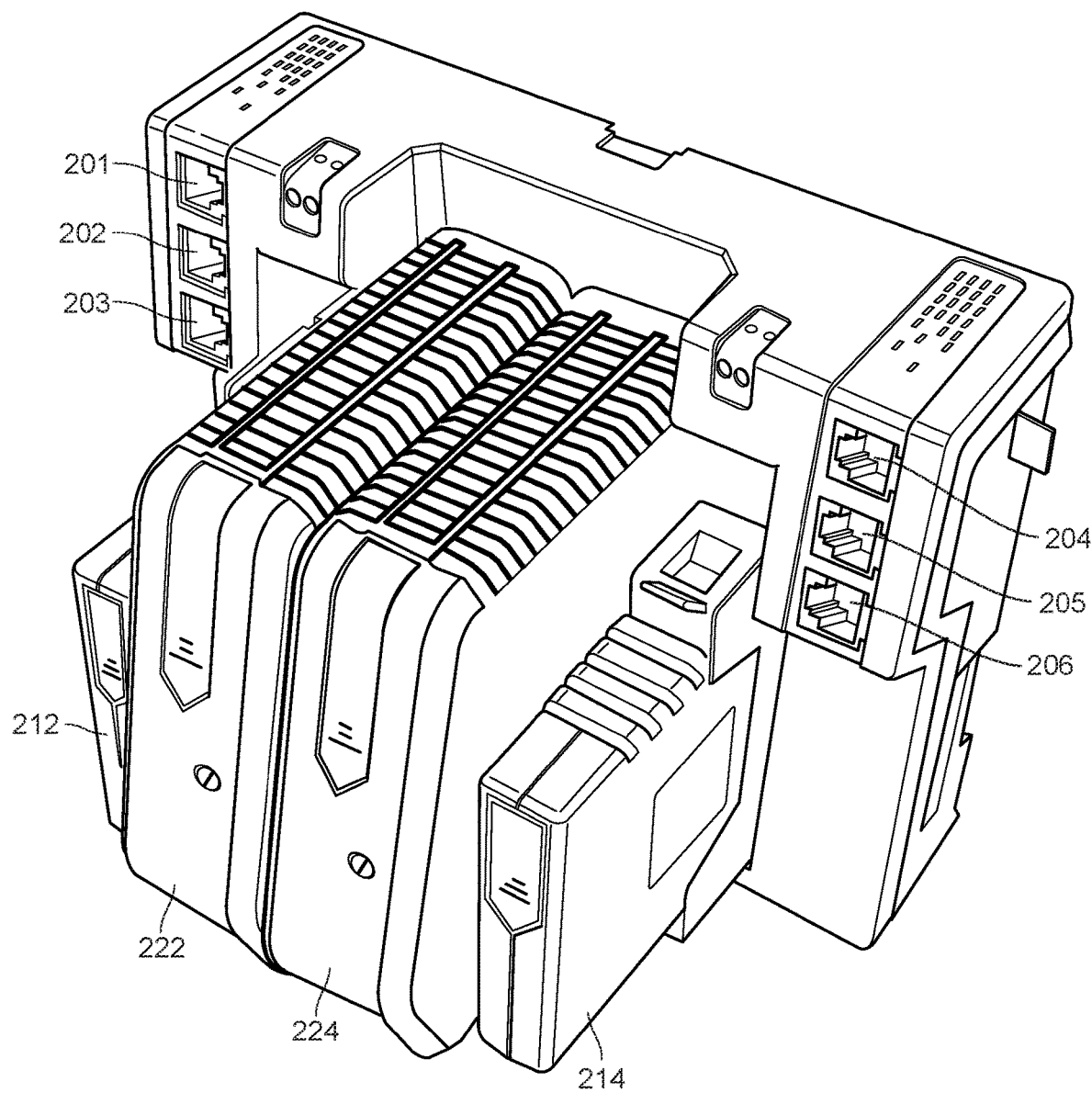
FIG. 2 is a perspective view of an embodiment of a modular controller associated with the modular control system of FIG. 1.

FIG. 2 is a perspective view of an embodiment of the enhanced modular controller 102 associated with the modular control system 100 of FIG. 1. The enhanced modular controller 102 may include a plurality of configurable communication ports 201-206. The plurality of communication ports 201-206 may be connected to (e.g., via network cables), and operable to, communicate with one or more nodes of the distributed control system 22 of the process plant 10. The plurality of communication ports 201-206 may include a first set of communication ports 201-203 and a second set of communication ports 203. As further described with respect to FIG. 3, the enhanced modular controller 102 may also include a software layer that accepts port configuration parameters. The port configuration parameters may define one or more port communication rules for the first set of communication ports 201-203 and for the second set of communication ports 204-206. The one or more port communication rules may also cause the software layer to selectively allow or restrict retransmission of incoming messages (e.g., data packets), where the incoming messages are received at either the first set of communication ports 201-203 or the second set of communication ports 204-206.

In some embodiments, the enhanced modular controller 102 may include two removable five-port switches (e.g., switches 212 and 214) that each have three exposed RJ45 physical communication ports, which correspond to the first set of communication ports 201-203 and the second set of communication ports 204-206, respectively. For each switch 212 and 214, and as shown for FIG. 2, two of the five ports may not be exposed as RJ45 physical ports, where such non-exposed ports are used for control and/or data transmission of the enhanced modular controller 102 within the distributed control system 22. In some instances the switches 212 and 214 may be referred to as IOPs, or input/output ports, of the modular controller.

In the embodiment of FIG. 2, communication ports 201-203 may form a first set of communication ports, and communication ports 204-206 may form a second set of communication ports. In some instances, the second network switch 214 may be redundant to the first network switch 212, where the first set of communication ports 201-203 of switch 212 are used for primary communications, and the second set of communication ports 204-206 of switch 214 are used for secondary communications. For example, in some instances, the second set of communication ports 204-206 may be redundant to the first set of communication ports 201-203, where the first set of first set of communication ports 201-203 performs primary communications, and the second set of communication ports 204-206 performs communications only in the event where the first set of communication ports 201-203 goes offline, experiences an error, or otherwise is unable to perform normal communications services. In additional embodiments, the second set of communication ports 204-206 may be redundant to the first set of communication ports 201-203, where the second set of communication ports 204-206 may be connected to the same nodes of the distributed control system 22 as the first set of communication ports 204-206.

In the embodiment of FIG. 2, the enhanced modular controller 102 also includes two controllers 222 and 224. The controllers 222 and 224 may perform control operations with respect to the modular control system 100 as described herein. For example, the enhanced modular controller 102 may include, as part of the controllers 222 and 224, a control logic layer operable to control equipment of the process plant 10. For example, the equipment may be configured to perform a physical function within the process plant 10 as described herein. In some embodiments, an incoming message may cause the control logic layer to initiate control of the equipment in the process plant 10. As described herein, the equipment and the enhanced modular controller 102 may each be a part of the same modular control system (e.g., a skid mounted system).

In some instances, the controllers 222 and 224 are redundant, where controller 222 is a primary controller and controller 224 is a secondary controller. For example, the primary controller 222 may include a control logic layer and a software layer, and the secondary controller 224 may include a redundant control logic layer and a redundant software layer that implement the same functionality of the primary controller 222. For example, in some instances, the secondary controller 224 may perform control operations for the modular control system 100, and enhanced modular controller 102, when the primary controller 222 has failed or has otherwise gone offline.

In some embodiments, the enhanced modular controller 102 may be built natively on a platform of the distributed system 22 of the process plant 10. In such embodiments, the enhanced modular controller may communicate with the one or more nodes of the distributed control system 22 via a native communication protocol (e.g., the DeltaV protocol). In such embodiments, at least one port of the plurality of communication ports 201-206 is configured as a native port, where the native port implements the native communication protocol of the distributed control system 22. For example, many nodes and devices of the distributed control system 22 may be connected to the enhanced modular controller 102 via the plurality of communication ports 201-206. In some embodiments, nodes implementing native communication protocols may be connected via the one or more of the communication ports 201-206. For example, a native DeltaV node using the DeltaV protocol may be connected to a communication port (e.g., communication port 201) configured to receive messages via the DeltaV protocol. The DeltaV node may be, for example, a laptop (e.g., host 14) or field workstation (e.g., workstation 50 or 52) that runs DeltaV based software on an operating system, such as Microsoft Windows or Linux. DeltaV nodes may also include standalone or balance-of-plant system nodes that are connected to modular controller 102 via the plurality of communication ports 201-206.

In other embodiments, the enhanced modular controller 102 may communicate with the one or more nodes of a distributed control system 22 via a standard communication protocol. In such embodiments, at least one port of the plurality of communication ports 201-206 is configured as a standard port, where the standard port implements a standard communication protocol such as the Modbus protocol, the Open Platform Communication (OPC) protocol, or the Internet Protocol (IP). For example, certain nodes of the distributed control system 22 may include Ethernet IO devices that implement and communicate via standard protocols, such as Modbus or EtherNet/IP. Other standard-protocol base nodes of distributed control system 22 may include third party workstations, such as local HMI stations, third party DCS interfaces, and/or third party historians, that implement, and communicate via, standard protocols, such as OPC UA or Modbus.

In the embodiment of FIG. 2, the switches 212 and 214 may perform typical packet switching functionality for incoming messages at communication ports 201-206. In various embodiments, the enhanced modular controller 102 allows the native protocol nodes and standard protocol nodes to be connected to the primary physical ports 201-203 and secondary ports 204-206, such that both the primary controller 222 and the secondary controller 224 are able to communicate with such nodes via primary communication (e.g., via communication ports 201-203) or secondary communication (e.g., via communication ports 204-206).

Figure 3:
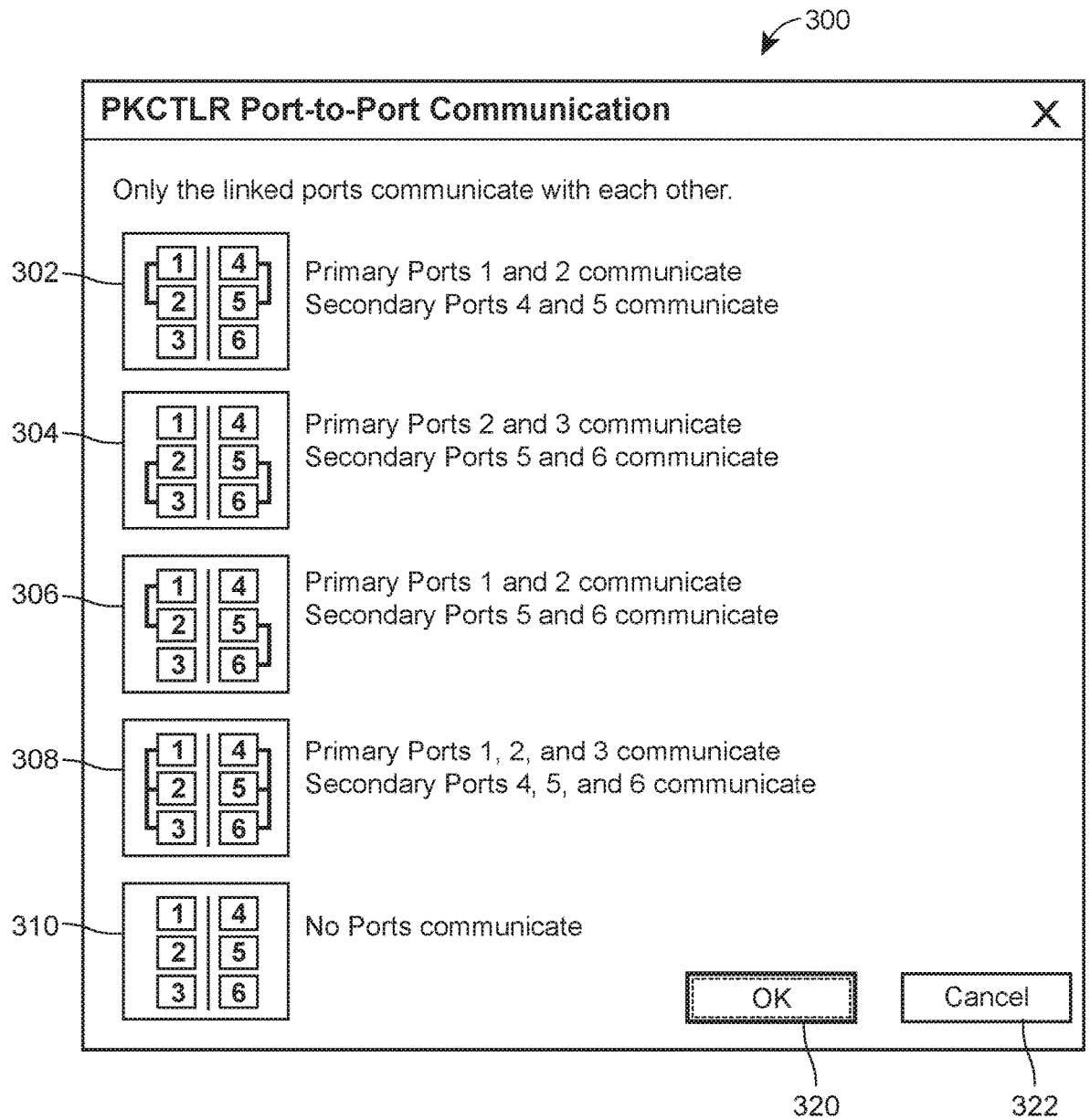
FIG. 3 illustrates an embodiment of a port configuration screen displaying one or more port communication rules for the modular controller of FIG. 2.

FIG. 3 illustrates an embodiment of a port configuration screen 300 displaying one or more port communication rules 302-310 for the modular controller of FIG. 2. The port configuration screen 300 allows operators and other users to select port communication rules 302-310. The port communication rules 203-310 allow users to segregate nodes and devices of the distributed control system 22 by protocol, e.g., to have certain nodes and devices use a given protocol connect to the enhanced modular controller 102 via one or two selected communication ports. For example, a user may use the port communication rules 302-310 to configure the DeltaV nodes to communicate with the topmost communication port(s) (e.g., communication ports 201 and 204), third party workstations node to communicate with the middle port(s) (e.g., communication ports 202 and 205), and Ethernet IO devices to communicate with the bottom port(s) (e.g., communication ports 203 and 206).

The instructions and software for the port configuration screen 300 and the one or more port communication rules 302-310 may be implemented in a programming language, such as C++, C#, Java or the like. The programming language instructions may cause a processor, such as a processor of any of workstations 50 or 52 or host 140, to display the port configuration screen 300 and allow, for example, an operator to select a port communication rule 302-310 to be used to configure the enhanced modular controller 102. For example, once a particular port communication rule is selected, and the user selects a confirmation button 320, the processor may cause the selected port communication rule to be downloaded, as port configuration parameters, to the configuration database 104 for use in configuring the enhanced modular controller 102 as described herein. For example, when the user chooses a port communication rule for the enhanced modular controller, that communication rule may be downloaded, via port configuration parameters, to the enhanced modular controller 102, where the enhanced modular controller 102 configures its switches (e.g., switches 212 and 214) and related communication ports 201-206 accordingly. For example, the port configuration parameters may downloaded to, and used by, the software layer of the enhanced modular controller 102 from a remote processor, such as the remote processor of workstations 50 or 52, or the remote processor of host 140. This provides a simple, and efficient, way of configuring the modular controller in distributed control system, and without the need for the user to manipulate multiple independent settings of the modular controller. The operator may also chose to cancel 322 the port configuration screen 300, which would cause the enhanced modular controller 102 to use the existing or default port communication rules.

In the embodiment of FIG. 3, each of the port communication rules 302-310 includes a graphic indicating six communication ports 1-6. The six communication ports 1-6 correspond to the six communication ports 201-206 of the enhanced modular controller 102 depicted in FIG. 2. Accordingly, communication ports 1-3 depicted in port communication rules 302-310 may correspond to a first set of communication ports, such as communication ports 201-203 of primary switch 212 of FIG. 2. Similarly, communication ports 4-6 depicted in port communication rules 302-310 may correspond to a second set of communication ports, such as communication ports 204-206 of primary switch 212 of FIG. 2. The port communication rules 302-310 allow configuration of the enhanced modular controller 102 and allows integration of the modular controller 102 into the distributed control system 22 without the need for external switches. For example, in an embodiment where three DeltaV communication nodes need to communicate in order to control the modular control system 100, then, by using the port communication rules, an operator could configure the enhanced modular controller 102 to communicate with three DeltaV nodes, by choosing option 308 from the set of port configuration rules.

For example, as depicted in FIG. 3, port communication rule 302 describes that primary communication ports 1 and 2 communicate, and that secondary ports 4 and 5 communicate. The ports communicate where incoming messages at one communication port are allowed to be retransmitted to the other communication port. Communication ports 1 and 2 of port communication rule 302 may correspond to communication ports 201 and 202 of FIG. 2, respectively. In the present embodiment, communication ports 1 and 2 are referred to as primary ports because each of the ports belongs to primary switch 212 of modular controller 102. Communication port 3 is also a primary communication port, and may correspond to communication port 203 of FIG. 2. However, in port communication rule 302, primary communication ports 1 and 2 do not communicate with, or retransmit incoming messages to, communication port 3, such that incoming messages at communication ports 1 and 2 are restricted from being retransmitted to communication port 3. In this way, port communication rule 302 allows incoming messages at communication ports 1 and 2 to be retransmitted to each other, but restricts incoming messages at communication ports 1 and 2 from being retransmitted to communication port 3. Similarly, port communication rule 302 restricts incoming messages at communication port 3 from being retransmitted to communication ports 1 or 2.

In a similar fashion, communication ports 4 and 5 of port communication rule 302 may correspond to communication ports 204 and 205 of FIG. 2, respectively. In the present embodiment, communication ports 4 and 5 are referred to as secondary ports because each of the ports belongs to secondary switch 214 of modular controller 102. Communication port 6 is also a secondary communication port, and may correspond to communication port 206 of FIG. 2. However, in port communication rule 302, secondary communication ports 4 and 5 do not communicate with, or retransmit incoming messages to, communication port 6, such that incoming messages at communication ports 4 and 5 are restricted from being retransmitted to communication port 6. In this way, port communication rule 302 allows incoming messages at communication ports 4 and 5 to be retransmitted to each other, but restricts incoming messages at communication ports 4 and 5 from being retransmitted to communication port 6. Similarly, port communication rule 302 restricts incoming messages at communication port 6 from being retransmitted to communication ports 4 or 5.

Port communication rule 304 describes that primary ports 2 and 3 communicate, and that secondary ports 5 and 6 communicate. Port communication rule 304 is a reversed mirror image of port communication rule 302, and may be used by an operator, for example, to configure the enhanced modular controller 102 to avoid moving networking cables, e.g., plugged into the communication ports 202-203 (primary ports), and 205-206 (secondary ports), when merging a standalone system into a balance-of-plant system.

Port communication rule 306 describes that primary ports 1 and 2 communicate, and that secondary ports 5 and 6 communicate. As described for FIG. 4, port communication rule 306 may be used to restrict incoming messages from being retransmitted to certain ports, while allowing other incoming messages to be retransmitted. This may be useful to provide an option to prevent certain nodes of the distributed control system 22 utilizing one type of protocol or system (e.g., DeltaV platform systems) from infecting other nodes using different protocols or systems (e.g., Microsoft Windows/Ethernet systems).

Port communication rule 308 describes that primary ports 1, 2, and 3 communicate, and that secondary ports 4, 5, and 6 communicate. Port communication rule 308 can be used when isolation, or specific retransmission rules, is not needed. Port communication rule 308 provides the most retransmission across ports for each set of communication ports, and, therefore, is the best option for an operator to avoid the use of external switches.

Port communication rule 310 describes that no ports communicate. Port communication rule 310 isolates all nodes connected to the enhanced modular controller 102, and, therefore, offers the most security, but may also require the use of external switches.

In another embodiment, a broadcast port communication rule (not show) may be selected, where all incoming messages are broadcast, or retransmitted to all other communication ports on a given set of communication ports (e.g., for the first set of communication ports, incoming message at communication port 1 are retransmitted to communication ports 2 and 3). In an additional embodiment, an all-port broadcast port communication rule (not show) may be selected, where all incoming messages are broadcast, or retransmitted to all other communication ports (e.g., incoming message at communication port 1 is retransmitted to all remaining communication ports 2-6).

In another embodiment, a single port communication rule (not shown) may be selected, where only communication port 1 (e.g., commination port 201 of FIG. 2) is enabled, and where all other communication ports 2-6 (e.g., communication ports 202-206 of FIG. 2) are disabled. In such embodiments, the incoming messages at communication port 1 may be used for control of the modular control system 100 as described herein.

Port communication rules may be selected to configure the enhanced modular controller 102 to retransmit unicast or broadcast-based messages. For example, in one embodiment the incoming messages may be incoming unicast messages, and the port communication rules may cause the software layer of the enhanced modular controller 102 to selectively allow or restrict transmission of the incoming unicast messages entering at any of the first communication port (e.g., communication port 201), the second communication port (e.g., communication port 202), or the third communication port (e.g., communication port 203) to a particular one of the first communication port, the second communication port, or the third communication port.

In another embodiment the incoming messages may be incoming broadcast-based messages, and the port communication rules may cause the software layer of the enhanced modular controller 102 to selectively allow or restrict transmission of the broadcast-based messages to the first communication port (e.g., communication port 201), the second communication port (e.g., communication port 202), and the third communication port (e.g., communication port 203).

Similar port communication rules, based on whether the incoming messages are unicast or broadcast-based messages, may be applied to the secondary communication ports 204-206 in a similar fashion.

Figure 4:
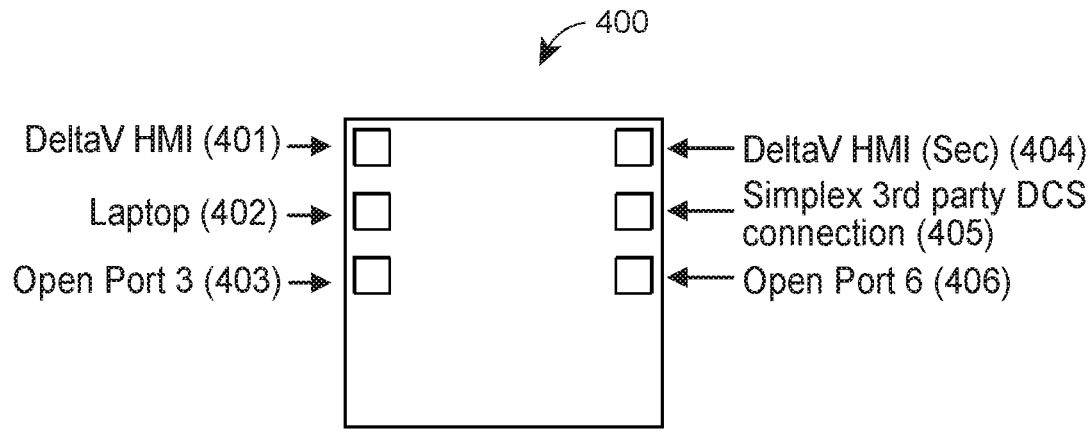
FIG. 4 illustrates an embodiment of an implementation of a particular port communication rule of the configuration screen of FIG. 3.

FIG. 4 illustrates an embodiment of an implementation 400 of a port communication rule of the configuration screen of FIG. 3. In particular, implementation 400 is an implementation of port communication rule 306 of FIG. 3. In the embodiment of FIG. 4, each of the communications ports 201, 202, 204, and 205 are connected to nodes of the distributed control system 22. For example, node 401 is a DeltaV HMI node connected to communication port 201 of the enhanced modular controller 102, node 402 is a Laptop (e.g., host 140), which, as described herein, may be a DeltaV node. Similarly, node 402 is a second (redundant) DeltaV HMI node connected to communication port 203, and node 405 is a Simplex $3^{rd}$ Party DCS connection, which may be a connection to a third-party DCS node (such as workstations 50 or 52 of FIG. 1). In the embodiment of FIG. 4, there are no nodes connected to communication ports 203 and 206, where such nodes are open or available for connection to additional nodes.

As shown in FIG. 4, an operator may use port communication rule 306 to maintain a level of enhanced isolation among the nodes of the distributed control system 22. This is advantageous, because, instead of relying on external firewalls to maintain isolation among the nodes, the operator can restrict communication among different nodes where a security concern may exist. As shown in FIG. 4, there may be a security concern that Windows malware on the third-party DCS node 405 might infect the DeltaV based nodes 401, 402, and 404. For example, in the embodiment of FIG. 4, the Simplex $3^{rd}$ Party DCS connection may be a connection to a third-party DCS node. An operator may desire to isolate the third-party DSC node for security reasons such that the DSC node 406 (corresponding to port 5 of port communication rule 306) would not be able to communicate with, and, therefore, would not be able to infect, any of the DeltaV nodes 401, 402, and 404 (corresponding to ports 1, 2, and 4 of port communication rule 306). Accordingly, by selecting port communication rule 306, the third party DSC node would not be able to infect the DeltaV nodes.

Figure 5:
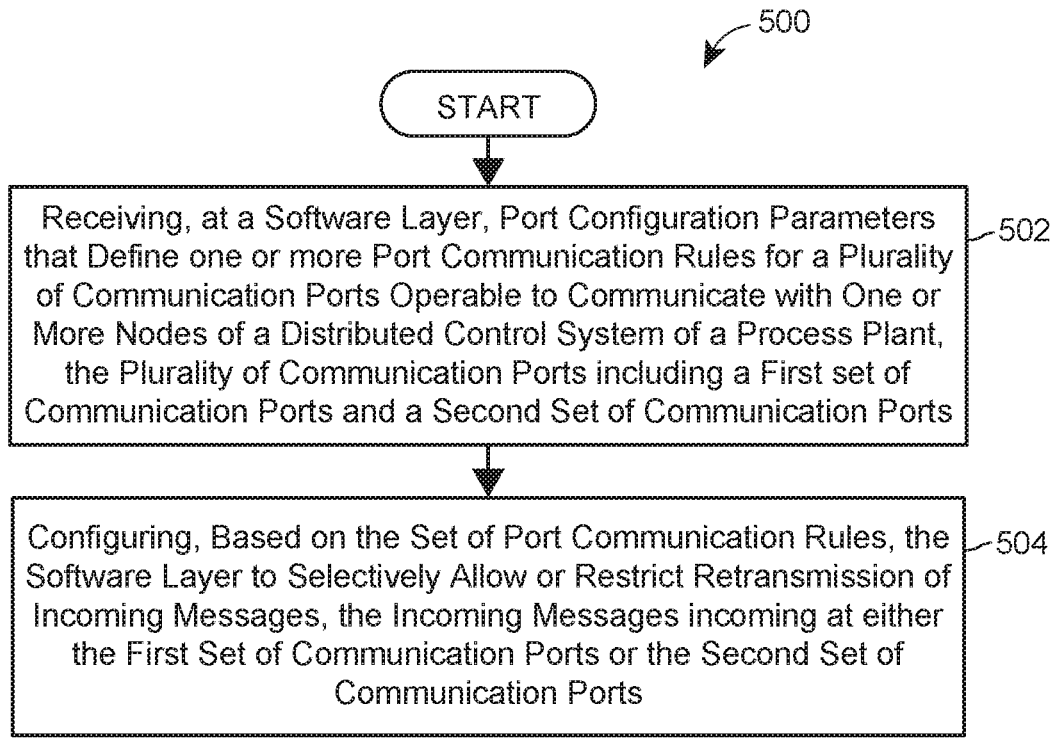
FIG. 5 is a flow diagram of an example method for configuring a plurality of communication ports of the modular controller of FIG. 1.

FIG. 5 is a flow diagram of an example method 500 for configuring the plurality of communication ports 201-206 of the enhanced modular controller 102 of the modular control system 100. Method 500 may be implemented, for example, by one or more processors of a modular control system 100 or enhanced modular controller 102. For example, a non-transitory computer-readable medium storing instructions may implement configuration of the plurality of communication ports of the enhanced modular controller 102 of a modular control system 100.

Method 500 begins at block 502, were one or more processors (e.g., of the enhanced modular controller 102) receives, at a software layer, port configuration parameters. The port configuration parameters may correspond to communication ports 201-206 of FIG. 2 and to related communication ports 1-6 as depicted in FIG. 3, and as described herein. The port configuration parameters may define one or more port communication rules (e.g., port communication rules 302-310) for the plurality of communication ports.

In various embodiments, the plurality of communication ports (e.g., communication ports 201-206) may be operable to communicate with one or more nodes (e.g., DeltaV nodes or standard protocol based nodes) of distributed control system 22 of process plant 10. The plurality of communication ports may include a first set of communication ports (e.g., communication ports 201-203) and a second set of communication ports (e.g., communication ports 204-206).

At block 504, the one or more processors configures, based on the one or more port communication rules (e.g., one of the port communication rules 302-310), the software layer to selectively allow or restrict retransmission of incoming messages. For example, in some embodiments, the software layer may be configured to create or update a virtual local area network (VLAN) lookup table and one or more VLANs associated with the VLAN lookup table in order to determine whether to allow or restrict retransmission of incoming messages. In such embodiments, the software layer may access the VLAN lookup table and the one or more VLANs to determine an ingress port identifier (ID) of a first communication port (e.g., communication port 201). The software layer may then access the VLAN lookup table, and the one or more VLANs to determine, based on the ingress port ID of the first communication port (e.g., communication port 201), at least one destination port ID, where the destination port ID identifies a second communication port (e.g., communication port 202) that the incoming message is to be retransmitted to.

As described herein, in some embodiments, the incoming messages may be based on a native protocol (e.g., DeltaV) of the distributed control system 22 of the process plant 10. In other embodiments, the incoming messages may be based on a standard protocol, e.g., Modbus, Ethernet, etc. The incoming messages may be received at either the first set of communication ports or the second set of communication ports, and then retransmitted to the remaining ports the respective first or second set of communication ports.

In some embodiments, as describe herein, the incoming messages may be incoming unicast messages. In such embodiments, the one or more processors of the enhanced modular controller 102 may be configured to either allow or restrict retransmission of the incoming unicast messages from a first communication port (e.g., communication port 201) of the first set of communication ports to a second communication port (e.g., communication port 203) of the first set of communication ports. The one or more processors of the enhanced modular controller 102 may also be configured to either allow or restrict retransmission from a first communication port (e.g., communication port 204) of the second set of communication ports to a second communication port (e.g., communication port 206) of the second set of communication ports.

In other embodiments, the incoming messages may be incoming broadcast-based messages. In such embodiments, the one or more processors of the enhanced modular controller 102 may be configured to retransmit the broadcast-based based messages from a first communication port (e.g., communication port 201) of the first set of communication ports to all remaining ports (e.g., communication ports 202 and 203) of the first set of communication ports, or from a first communication port (e.g., communication port 204) of the second set of communication ports to all remaining ports (e.g., communication ports 205 and 206) of the second set of communication ports.

Accordingly, as described herein, for distributed control systems (e.g., distributed control system 22) that make use of modular control systems, the systems and methods of the present disclosure allow for an operator, or other user, to configure an enhanced modular controller (e.g., enhanced modular controller 102) to integrate the modular control system into the distributed control system.

Additional Remarks

Unless specifically stated otherwise, discussions herein using words such as "processing," "computing," "calculating," "determining," "identifying," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

When implemented in software, any of the applications, services, engines, routines, and modules described herein may be stored in any tangible, non-transitory computer readable memory such as on a magnetic disk, a laser disk, solid state memory device, molecular memory storage device, an optical disk, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the techniques of this disclosure have been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. An enhanced modular controller comprising:
a control logic layer operable to control equipment of a process plant, the equipment configured to perform a physical function within the process plant;
a plurality of communication ports, the plurality of communication ports operable to communicate with one or more nodes of a distributed control system of the process plant, wherein the plurality of communication ports include a first set of communication ports and a second set of communication ports; and
a software layer that accepts port configuration parameters, the port configuration parameters defining one or more port communication rules for the first set of communication ports and for the second set of communication ports, the one or more port communication rules causing the software layer to selectively allow or restrict retransmission of incoming messages, the incoming messages incoming at either the first set of communication ports or the second set of communication ports.

2. The enhanced modular controller of claim 1, wherein at least one incoming message causes the control logic layer to control the equipment of the process plant.

3. The enhanced modular controller of claim 1, wherein the equipment and the enhanced modular controller are each a part of a modular control system.

4. The enhanced modular controller of claim 3, wherein the modular control system is a skid-mounted system.

5. The enhanced modular controller of claim 1, wherein the enhanced modular controller is built natively on a platform of the distributed system of the process plant, the enhanced modular controller communicating with the one or more nodes of the distributed control system via a native communication protocol, and wherein at least one port of the plurality of communication ports is configured as a native port, the native port implementing the native communication protocol of the distributed control system.

6. The enhanced modular controller of claim 1, wherein the enhanced modular controller communicates with the one or more nodes of a distributed control system via a standard communication protocol, and wherein at least one port of the plurality of communication ports is configured as a standard port, the standard port implementing the standard communication protocol.

7. The enhanced modular controller of claim 1, wherein the first set of communication ports includes a first communication port, a second communication port, and a third communication port.

8. The enhanced modular controller of claim 7, wherein the incoming messages are incoming unicast messages, and wherein the one or more port communication rules causes the software layer to selectively allow the incoming unicast messages entering at any of the first communication port, the second communication port, or the third communication port to be transmitted to a particular one of the first communication port, the second communication port, or the third communication port.

9. The enhanced modular controller of claim 7, wherein the incoming messages are incoming unicast messages, and wherein the one or more port communication rules causes the software layer to selectively restrict the incoming unicast messages entering at any of the first communication port, the second communication port, or the third communication port from being transmitted to a particular one of the first communication port, the second communication port, or the third communication port.

10. The enhanced modular controller of claim 7, wherein the incoming messages are incoming broadcast-based messages, and wherein the one or more port communication rules causes the software layer to selectively allow or restrict transmission of the broadcast-based messages to the first communication port, the second communication port, and the third communication port.

11. The enhanced modular controller of claim 1, wherein the second set of communication ports includes a fourth communication port, a fifth communication port, and a sixth communication port.

12. The enhanced modular controller of claim 11, wherein the incoming messages are incoming unicast messages, and wherein the one or more port communication rules causes the software layer to selectively allow the incoming unicast messages entering at any of the fourth communication port, the fifth communication port, or the sixth communication port to be transmitted to a particular one of the fourth communication port, the fifth communication port, or the sixth communication port.

13. The enhanced modular controller of claim 11, wherein the incoming messages are incoming unicast messages, and wherein the one or more port communication rules causes the software layer to selectively restrict the incoming unicast messages entering at any of the fourth communication port, the fifth communication port, or the sixth communication port from being transmitted to a particular one of the fourth communication port, the fifth communication port, or the sixth communication port.

14. The enhanced modular controller of claim 11, wherein the incoming messages are incoming broadcast-based messages, and wherein the one or more port communication rules causes the software layer to selectively allow or restrict transmission of the broadcast-based messages to the fourth communication port, the fifth communication port, or the sixth communication port.

15. The enhanced modular controller of claim 1, wherein the port configuration parameters causes the software layer to create or update a virtual local area network (VLAN) lookup table and one or more VLANS associated with the VLAN lookup table, the software layer accessing the VLAN lookup table and the one or more VLANs to selectively allow or restrict retransmission of incoming messages.

16. The enhanced modular controller of claim 15, wherein an incoming message at a first communication port of the plurality of communication ports causes the software layer to lookup in the VLAN table an ingress port identifier (ID) of the first communication port and to determine, based on the ingress port ID, at least one destination port ID, the at least one destination port ID identifying a second communication port that the incoming message is to be retransmitted to.

17. The enhanced modular controller of claim 1 further comprising a first controller and a second controller, wherein the first controller includes the control logic layer and the software layer, and wherein the second controller includes a redundant control logic layer and a redundant software layer, the redundant control logic redundant to the control logic layer and the redundant software layer redundant to the software layer.

18. The enhanced modular controller of claim 1, wherein the first set of communication ports is associated with a first network switch and the second set of communication ports are associated with a second network switch.

19. The enhanced modular controller of claim 18, wherein the second network switch is redundant to the first network switch.

20. The enhanced modular controller of claim 1, wherein the port configuration parameters are downloaded to the software layer from a remote processor.

21. A method for configuring a plurality of communication ports of an enhanced modular controller of a modular control system, the method comprising:
receiving, at a software layer, port configuration parameters, the port configuration parameters defining one or more port communication rules for the plurality of communication ports, the plurality of communication ports operable to communicate with one or more nodes of a distributed control system of a process plant, and the plurality of communication ports including a first set of communication ports and a second set of communication ports; and
configuring, based on the one or more port communication rules, the software layer to selectively allow or restrict retransmission of incoming messages, the incoming messages incoming at either the first set of communication ports or the second set of communication ports.

22. The method of claim 21, wherein the incoming messages are based on a native protocol of the distributed control system of the process plant.

23. The method of claim 21, wherein the incoming messages are based on a standard protocol.

24. The method of claim 21, wherein the incoming messages are incoming unicast messages, and wherein the incoming unicast messages are retransmitted from at least one of:
a first communication port of the first set of communication ports to a second communication port of the first set of communication ports, or
a first communication port of the second set of communication ports to a second communication port of the second set of communication ports.

25. The method of claim 21, wherein the incoming messages are incoming unicast messages, and wherein the incoming unicast messages are restricted from being retransmitted to at least one of:
a first communication port of the first set of communication ports to a second communication port of the first set of communication ports, or
a first communication port of the second set of communication ports to a second communication port of the second set of communication ports.

26. The method of claim 21, wherein the incoming messages are incoming broadcast-based messages, and wherein the incoming broadcast-based messages are retransmitted from at least one of:
a first communication port of the first set of communication ports to all remaining ports of the first set of communication ports, or
a first communication port of the second set of communication ports to all remaining ports of the second set of communication ports.

27. The method of claim 21, wherein the configuring, with the configuration parameters, the software layer to selectively allow or restrict the retransmission of incoming messages includes:
creating or updating, with the software layer, a virtual local area network (VLAN) lookup table and one or more VLANS associated with the VLAN lookup table,
accessing, with the software layer, the VLAN lookup table and the one or more VLANs to determine an ingress port identifier (ID) of a first communication port, and
accessing, with the software layer, the VLAN lookup table and the one or more VLANs to determine, based on the ingress port ID, at least one destination port ID, the at least one destination port ID identifying a second communication port that the incoming message is to be retransmitted to.

28. A non-transitory computer-readable medium storing instructions that implement configuration of a plurality of communication ports of an enhanced modular controller of a modular control system, wherein the instructions executes on one or more processors to:
receive, at a software layer, port configuration parameters, the port configuration parameters defining one or more port communication rules for the plurality of communication ports, the plurality of communication ports operable to communicate with one or more nodes of a distributed control system of a process plant, and the plurality of communication ports including a first set of communication ports and a second set of communication ports; and
configure, based on the one or more port communication rules, the software layer to selectively allow or restrict retransmission of incoming messages, the incoming messages incoming at either the first set of communication ports or the second set of communication ports.

29. The non-transitory computer-readable medium storing instructions of claim 28, wherein the incoming messages are based on a native protocol of the distributed control system of the process plant.

30. The non-transitory computer-readable medium storing instructions of claim 28, wherein the incoming messages are based on a standard protocol.

31. The non-transitory computer-readable medium storing instructions of claim 28, wherein the incoming messages are incoming unicast messages, and wherein the incoming unicast messages are retransmitted from at least one of:
a first communication port of the first set of communication ports to a second communication port of the first set of communication ports, or
a first communication port of the second set of communication ports to a second communication port of the second set of communication ports.

32. The non-transitory computer-readable medium storing instructions of claim 28, wherein the incoming messages are incoming unicast messages, and wherein the incoming unicast messages are restricted from being retransmitted to at least one of:
a first communication port of the first set of communication ports to a second communication port of the first set of communication ports, or
a first communication port of the second set of communication ports to a second communication port of the second set of communication ports.

33. The non-transitory computer-readable medium storing instructions of claim 28, wherein the incoming messages are incoming broadcast-based messages, and wherein the incoming broadcast-based messages are retransmitted from at least one of:
a first communication port of the first set of communication ports to all remaining ports of the first set of communication ports, or
a first communication port of the second set of communication ports to all remaining ports of the second set of communication ports.

34. The non-transitory computer-readable medium storing instructions of claim 28, wherein the configuring, with the configuration parameters, the software layer to selectively allow or restrict the retransmission of incoming messages includes:
- creating or updating, with the software layer, a virtual local area network (VLAN) lookup table and one or more VLANS associated with the VLAN lookup table,
- accessing, with the software layer, the VLAN lookup table and the one or more VLANs to determine an ingress port identifier (ID) of a first communication port, and
- accessing, with the software layer, the VLAN lookup table and the one or more VLANs to determine, based on the ingress port ID, at least one destination port ID, the at least one destination port ID identifying a second communication port that the incoming message is to be retransmitted to.

* * * * *